US012776345B2

(12) United States Patent
Moriwaki

(10) Patent No.: US 12,776,345 B2
(45) Date of Patent: Oct. 27, 2026

(54) DATA AUGMENTATION APPARATUS, DATA AUGMENTATION METHOD, AND NON-TRANSITORY COMPUTER READABLE MEDIUM

(71) Applicant: NEC Corporation, Tokyo (JP)

(72) Inventor: Kosuke Moriwaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/729,295

(22) PCT Filed: Jan. 21, 2022

(86) PCT No.: PCT/JP2022/002224
§ 371 (c)(1),
(2) Date: Jul. 16, 2024

(87) PCT Pub. No.: WO2023/139760
PCT Pub. Date: Jul. 27, 2023

(65) Prior Publication Data
US 2025/0131943 A1 Apr. 24, 2025

(51) Int. Cl.
*G11B 27/031* (2006.01)
*G06V 10/764* (2022.01)

(52) U.S. Cl.
CPC .......... *G11B 27/031* (2013.01); *G06V 10/764* (2022.01)

(58) Field of Classification Search
CPC ............................ G11B 27/031; G06V 10/764
See application file for complete search history.

(56) References Cited

U.S. PATENT DOCUMENTS

2023/0075453 A1* 3/2023 Mitra .................... G06F 16/285

FOREIGN PATENT DOCUMENTS

| | | | |
|---|---|---|---|
| JP | 2005-269510 | A | 9/2005 |
| JP | 2021-179790 | A | 11/2021 |
| WO | 2020/070876 | A1 | 4/2020 |
| WO | 2020/178936 | A1 | 9/2020 |
| WO | 2021/059388 | A1 | 4/2021 |
| WO | 2021/079507 | A1 | 4/2021 |

OTHER PUBLICATIONS

International Search Report for PCT Application No. PCT/JP2022/002224, mailed on Apr. 5, 2022.

Taeoh Kim, Hyeongmin Lee, MyeongAh Cho, Ho Seong Lee, Dong Heon Cho and Sangyoun Lee, "Learning Temporally Invariant and Localizable Features via Data Augmentation for Video Recognition", Aug. 13, 2020, <URL: https://arxiv.org/pdf/2008.05721.pdf>.

* cited by examiner

*Primary Examiner* — Mishawn N. Hunter
(74) *Attorney, Agent, or Firm* — Sughrue Mion, PLLC

(57) ABSTRACT

A data augmentation apparatus acquires source time-series data. The data augmentation apparatus generates augmented time-series data by performing a modification process on one or more pieces of target time-series data included in the source time-series data. The target time-series data includes a plurality of frames belonging to the same class. The modification process includes a deletion process of deleting the target time-series data, a length change process of changing a length of the target time-series data, or a position change process of changing a position of the target time-series data on a time axis.

11 Claims, 13 Drawing Sheets

200

| FRAME IDENTIFICATION INFORMATION (202) | CLASS IDENTIFICATION INFORMATION (204) |
|---|---|
| f0001 | C1 |
| f0002 | C1 |
| . . . | . . . |
| f0110 | C2 |
| . . . | . . . |

300

| FIRST FRAME IDENTIFICATION INFORMATION (302) | LAST FRAME IDENTIFICATION INFORMATION (304) | CLASS IDENTIFICATION INFORMATION (306) |
|---|---|---|
| f0001 | f0109 | C1 |
| f0110 | f01210 | C2 |
| . . . | . . . | . . . |

Fig. 6

DATA AUGMENTATION APPARATUS, DATA AUGMENTATION METHOD, AND NON-TRANSITORY COMPUTER READABLE MEDIUM

This application is a National Stage Entry of PCT/JP2022/002224 filed on Jan. 21, 2022, the contents of all of which are incorporated herein by reference, in their entirety.

TECHNICAL FIELD

The present disclosure relates to data augmentation of time-series data.

BACKGROUND ART

A system that generates new data by processing data, that is, performs data augmentation has been developed. For example, Non Patent Literature 1 discloses a technique of increasing the number of pieces of training data by performing data augmentation on video data prepared as training data in order to train a classification model that performs class identification of input video data.

CITATION LIST

Non Patent Literature

Non Patent Literature 1: Taeoh Kim, Hyeongmin Lee, MyeongAh Cho, Ho Seong Lee, Dong Heon Cho, and Sangyoun Lee, "Learning Temporally Invariant and Localizable Features via Data Augmentation for Video Recognition", [online], Aug. 13, 2020, arXiv. org, [retrieved on Jan. 13, 2022], Internet, <URL: https://arxiv.org/pdf/2008.05721.pdf>

SUMMARY OF INVENTION

Technical Problem

In Non Patent Literature 1, it is assumed that class identification is performed on the entire video data input to the model (in other words, a single class is assigned to the entire video data input to the model). The present disclosure has been made in view of this problem, and an objective of the present disclosure is to provide a new technique of performing data augmentation on time-series data.

Solution to Problem

According to the present disclosure, there is provided a data augmentation apparatus including: acquisition means for acquiring source time-series data including a plurality of frames in a time series; and augmentation processing means for generating augmented time-series data from the source time-series data by executing, on one or more pieces of target time-series data that are included in the source time-series data and configured by a plurality of consecutive frames belonging to a same class as each other, a deletion process of deleting target time-series data, a length change process of changing a length of the target time-series data, or a position change process of changing a position of the target time-series data on a time axis. The source time-series data includes a plurality of frames belonging to different classes.

A data augmentation method of the present disclosure is executed by a computer. The method includes: an acquisition step of acquiring source time-series data including a plurality of frames in a time series; and an augmentation processing step of generating augmented time-series data from the source time-series data by executing, on one or more pieces of target time-series data that are included in the source time-series data and configured by a plurality of consecutive frames belonging to a same class as each other, a deletion process of deleting target time-series data, a length change process of changing a length of the target time-series data, or a position change process of changing a position of the target time-series data on a time axis. The source time-series data includes a plurality of frames belonging to different classes.

A non-transitory computer readable medium of the present disclosure stores a program for causing a computer to execute the data augmentation method of the present disclosure.

Advantageous Effects of Invention

According to the present disclosure, a new technique of performing data augmentation of time-series data is provided.

BRIEF DESCRIPTION OF DRAWINGS

FIG. 6 is a diagram exemplifying class information in a table format.

EXAMPLE EMBODIMENT

Figure 1:
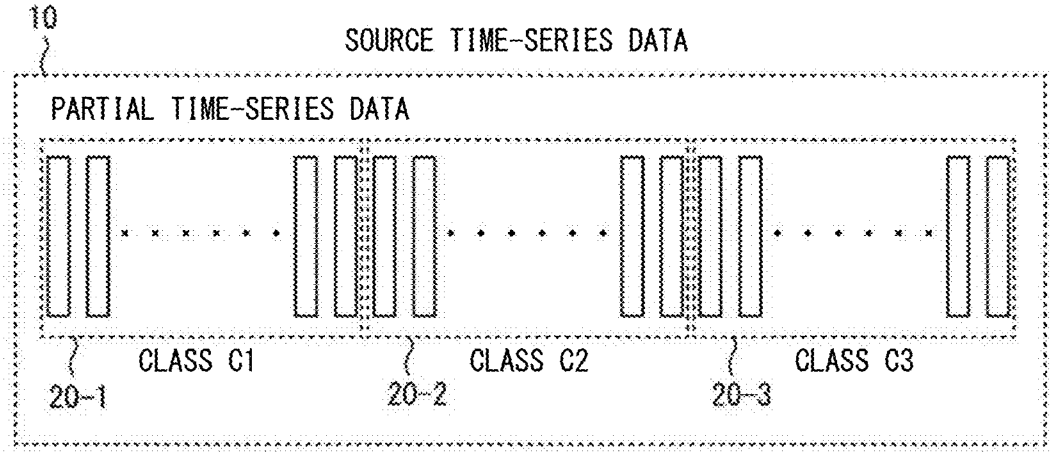
FIG. 1 is a diagram exemplifying source time-series data 10 handled by a data augmentation apparatus according to an example embodiment.

Hereinafter, an example embodiment of the present disclosure will be described in detail with reference to the drawings. In the drawings, the same or corresponding elements are denoted by the same reference numerals, and repeated description is omitted as necessary for clarity of description. In addition, unless otherwise described, values set in advance such as predetermined values and threshold values are stored in advance in a storage device or the like accessible from an apparatus using the values. Furthermore, unless otherwise described, a storage unit includes one or more storage devices of any number.

Overview

FIG. 1 is a diagram exemplifying source time-series data 10 handled by a data augmentation apparatus according to an example embodiment. The source time-series data 10 includes a plurality of frames 12 in a time series. In other words, the source time-series data 10 can also be said to be a data sequence in which the frames 12 are arranged in a time series.

For example, the source time-series data 10 is video data. The video data is time-series data in which a plurality of video frames is arranged in order (in ascending order of frame numbers). Therefore, in a case where the source time-series data 10 is video data, the frame 12 is a video frame configuring the video data.

Each frame 12 belongs to one of a plurality of classes. The source time-series data 10 includes a plurality of pieces of partial time-series data 20. The partial time-series data 20 is time-series data including a plurality of consecutive frames 12 belonging to the same class. For example, the source time-series data 10 in FIG. 1 includes partial time-series data 20-1 including a plurality of frames 12 belonging to a class C1, partial time-series data 20-2 including a plurality of frames 12 belonging to a class C2, and partial time-series data 20-3 including a plurality of frames 12 belonging to a class C3 in this order. Hereinafter, time-series data including a plurality of frames 12 belonging to the class C will also be referred to as "time-series data belonging to the class C".

Here, the source time-series data 10 includes at least two pieces of partial time-series data 20 belonging to different classes. However, the source time-series data 10 may include two or more pieces of partial time-series data 20 belonging to the same class. For example, in the example in FIG. 1, the partial time-series data 20-1 and the partial time-series data 20-3 may belong to the class C1, and the partial time-series data 20-2 may belong to the class C2.

The class represents, for example, content of the partial time-series data 20 (for example, a scene or a situation represented by the partial time-series data 20). For example, it is assumed that a scene in which a worker is performing work including three processes P1, P2, and P3 is captured by a video camera, and video data obtained through the capturing is handled as the source time-series data 10. In this case, each work process can be handled as a class. That is, the source time-series data 10 may be divided into three pieces of partial time-series data 20: that is, partial time-series data 20 including a scene of the work of the process P1, partial time-series data 20 including a scene of the work of the process P2, and partial time-series data 20 including a scene of the work of the process P3.

The type of the source time-series data 10 is not limited to video data. For example, the source time-series data 10 may be audio data.

In addition, for example, the source time-series data 10 may be sensing data representing a result of sensing repeatedly performed by any sensor (for example, a three-dimensional acceleration sensor).

Figure 2:
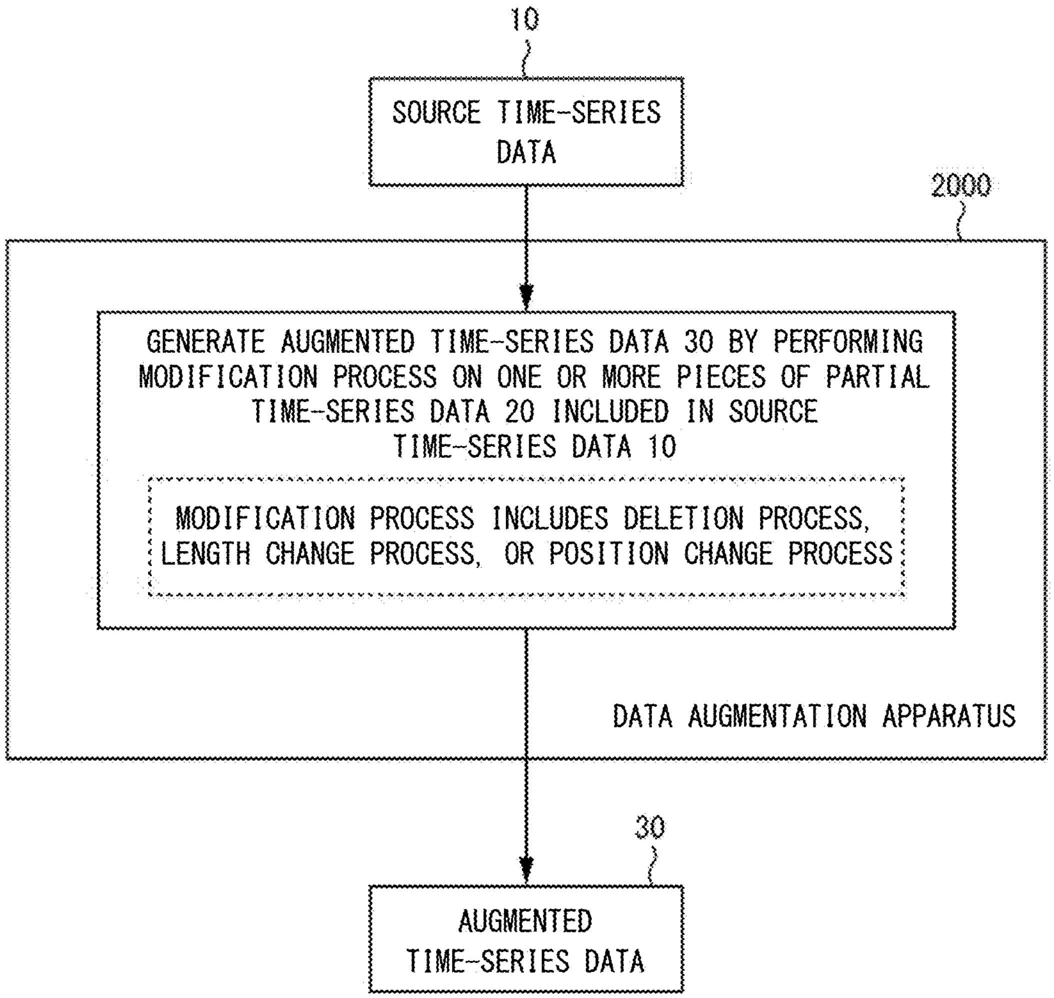
FIG. 2 is a diagram exemplifying an outline of an operation of the data augmentation apparatus according to the example embodiment.

FIG. 2 is a diagram exemplifying an overview of an operation of a data augmentation apparatus 2000 according to the example embodiment. Here, FIG. 2 is a diagram for facilitating understanding of the overview of the data augmentation apparatus 2000, and an operation of the data augmentation apparatus 2000 is not limited to that illustrated in FIG. 2.

The data augmentation apparatus 2000 generates augmented time-series data 30 different from the source time-series data 10 by processing at least one piece of partial time-series data 20 included in the source time-series data 10. Consequently, data augmentation is achieved. Hereinafter, among the partial time-series data 20 included in the source time-series data 10, data that is a target of a modification process will be referred to as "target time-series data".

A modification process performed on the source time-series data 10 includes, for example, 1) a deletion process, 2) a length change process, or 3) a position change process. Here, "the modification process includes 1), 2), or 3)" indicates that the modification process may include a combination of two or more processes of 1) to 3).

The deletion process is a process of deleting target time-series data. That is, the augmented time-series data 30 does not include the target time-series data that is a target of the deletion process. The length change process is a process of changing the length of the target time-series data on the time axis. Therefore, the number of frames 12 included in the target time-series data after the modification is different from the number of frames 12 included in the target time-series data before the modification. The position change process is a process of changing a position of the target time-series data on the time axis. Therefore, a position of the target time-series data on the time axis in the augmented time-series data 30 is different from a position of the target time-series data on the time axis in the source time-series data 10. As a combination of the length change process and the position change process, for example, a modification process such as "performing a length change process of changing a length of one or both of two pieces of target time-series data, and performing a position change process of exchange their positions" may be considered.

Here, in a case where a plurality of types of modification processes are performed on the source time-series data 10, the plurality of types of modification processes may be performed on the same target time-series data or may be performed on different pieces of target time-series data. In the former case, for example, after the length change process of changing a length of the partial time-series data 20-1 is performed, the position change process of changing a position of the partial time-series data 20-1 is performed. In the latter case, for example, after the deletion process of deleting the partial time-series data 20-1 is performed, the position change process of changing a position of the partial time-series data 20-2 is performed.

Example of Advantageous Effect

According to the data augmentation apparatus 2000 of the present example embodiment, the augmented time-series data 30 is generated by performing a modification process on one or more pieces of partial time-series data 20 included in the source time-series data 10. Here, the source time-series data 10 includes a plurality of pieces of partial time-series data 20 belonging to different classes. Thus, according to the data augmentation apparatus 2000, it is possible to generate time-series data including a plurality of pieces of partial time-series data 20 belonging to different classes through data augmentation.

Such data augmentation is useful, for example, for training a classifier that identifies a class of each frame configuring the time-series data in response to input of the time-series data. For example, a classifier that identifies a class of each video frame in response to input of video data can be considered. For example, the training data used for training such the classifier indicates time-series data as input data and indicates a class of each frame included in the time-series data as ground truth data.

In order to obtain a classifier with high classification accuracy, it is preferable to train the classifier by using more pieces of training data. However, it takes time and effort to prepare many pieces of training data. In this regard, if the data augmentation apparatus 2000 of the present example embodiment is used, an amount of training data can be increased through data augmentation. Therefore, time and effort required for preparing the training data are reduced, and a lot of training data can be more easily prepared.

In addition, in order to obtain a classifier with high accuracy, it is preferable to increase variations of the training data. However, when the training data is generated, there is a case where a variation is likely to be biased. For example, as such a case, there is a case where training data is prepared by observing an actual situation. As a more specific example, there is a case where video data obtained by capturing a scene of daily work in a factory with a monitoring camera is used as training data.

In a case where an actual situation is observed in this manner, an abnormal situation is less likely to be observed than a normal situation. For example, in the case of capturing the work in the factory described above, it is considered that the work is performed in a normal procedure in most cases, and the work performed in an incorrect procedure is rarely captured. Therefore, the number of pieces of training data indicating an abnormal situation is smaller than the number of pieces of training data indicating a normal situation. However, in order to increase variations of the training data, it is preferable that the number of pieces of training data representing an abnormal situation is also large.

In this regard, when the data augmentation apparatus 2000 is used, the augmented time-series data 30 representing an abnormal situation can be generated by acquiring time-series data representing a normal situation as the source time-series data 10 and performing a modification process on the time-series data. For example, it is possible to generate video data representing a scene of abnormal work from video data in which a scene of normal work in daily life is recorded. Therefore, according to the data augmentation apparatus 2000, variations of the training data can be easily increased.

Hereinafter, the data augmentation apparatus 2000 of the present example embodiment will be described in more detail.

Example of Functional Configuration

Figure 3:
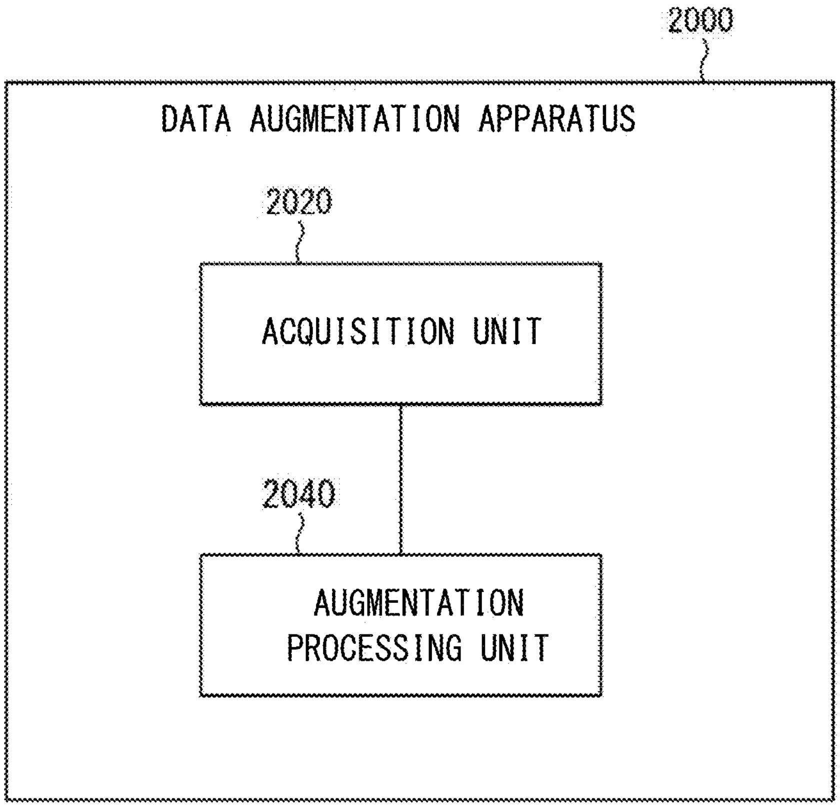
FIG. 3 is a block diagram exemplifying a functional configuration of the data augmentation apparatus.

FIG. 3 is a block diagram exemplifying a functional configuration of the data augmentation apparatus 2000 according to the example embodiment. The data augmentation apparatus 2000 includes an acquisition unit 2020 and an augmentation processing unit 2040. The acquisition unit 2020 acquires the source time-series data 10. The augmentation processing unit 2040 generates the augmented time-series data 30 from the source time-series data 10 by performing a modification process on one or more pieces of target time-series data included in the source time-series data 10.

Example of Hardware Configuration

Each functional constituent of the data augmentation apparatus 2000 may be realized by hardware (for example, a hard-wired electronic circuit) that realizes each functional constituent, or may be realized by a combination of hardware and software (for example, a combination of an electronic circuit and a program that controls the electronic circuit). Hereinafter, a case where each functional constituent of the data augmentation apparatus 2000 is realized by a combination of hardware and software will be further described.

Figure 4:
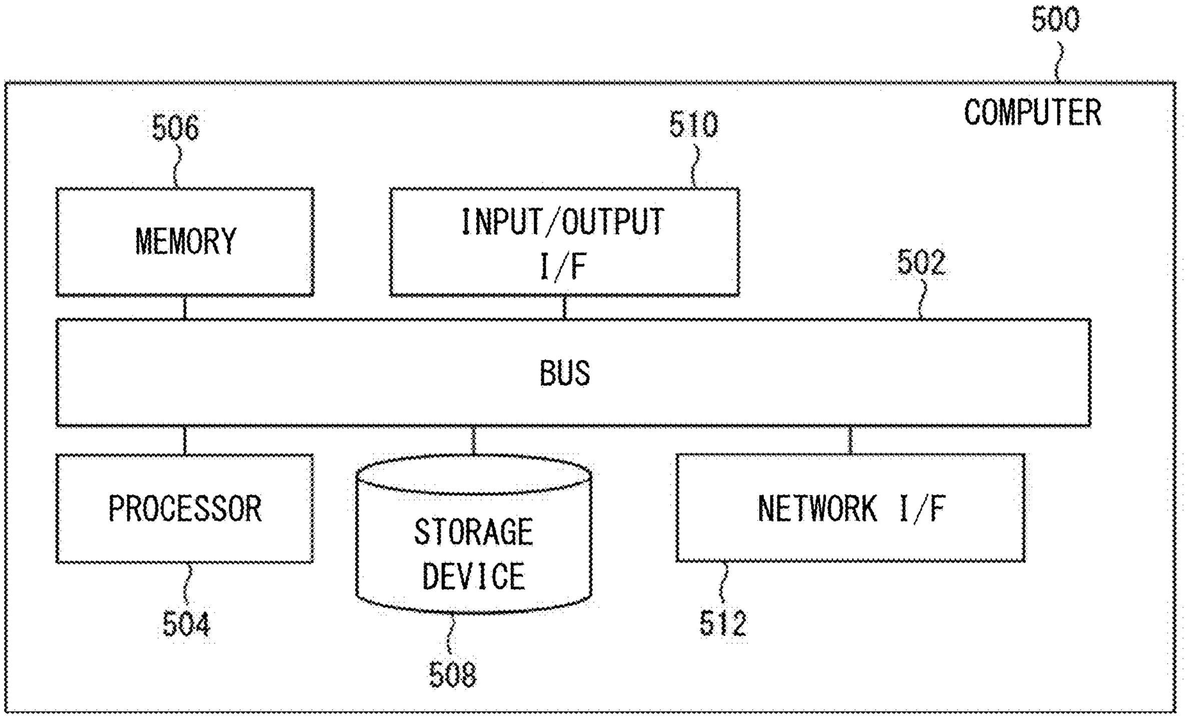
FIG. 4 is a block diagram exemplifying a hardware configuration of a computer that implements the data augmentation apparatus.

FIG. 4 is a block diagram exemplifying a hardware configuration of a computer 500 that implements the data augmentation apparatus 2000. The computer 500 is any computer. For example, the computer 500 is a stationary computer such as a personal computer (PC) or a server machine. In another example, the computer 500 is a portable computer such as a smartphone or a tablet terminal. The computer 500 may be a special-purpose computer designed to implement the data augmentation apparatus 2000, or may be a general-purpose computer.

For example, by installing a predetermined application in the computer 500, each function of the data augmentation apparatus 2000 is realized in the computer 500. The application includes a program for realizing each functional constituent of the data augmentation apparatus 2000. Note that any method of acquiring a program may be used. For example, the program may be acquired from a storage medium (a DVD disk, a USB memory, or the like) in which the program is stored. The program may also be acquired, for example, by downloading the program from a server apparatus that manages a storage device in which the program is stored.

The computer 500 includes a bus 502, a processor 504, a memory 506, a storage device 508, an input/output interface 510, and a network interface 512. The bus 502 is a data transmission path for the processor 504, the memory 506, the storage device 508, the input/output interface 510, and the network interface 512 to transmit and receive data to and from each other. However, a method of connecting the processor 504 and the like to each other is not limited to the bus connection.

The processor 504 is any of processors such as a central processing unit (CPU), a graphics processing unit (GPU), and a field-programmable gate array (FPGA). The memory 506 is a main storage device implemented by using a random access memory (RAM) or the like. The storage device 508 is an auxiliary storage device implemented by using a hard disk, a solid state drive (SSD), a memory card, a read only memory (ROM), or the like.

The input/output interface 510 is an interface connecting the computer 500 and an input/output device. For example, an input apparatus such as a keyboard and an output apparatus such as a display apparatus are connected to the input/output interface 510.

The network interface 512 is an interface connecting the computer 500 to a network. The network may be a local area network (LAN) or a wide area network (WAN).

The storage device 508 stores a program for realizing each functional constituent of the data augmentation apparatus 2000 (a program for realizing the above-described application). The processor 504 reads the program into the memory 506 and executes the program to realize each functional constituent of the data augmentation apparatus 2000.

The data augmentation apparatus 2000 may be implemented by a single computer 500 or may be implemented by a plurality of computers 500. In the latter case, configurations of the computers 500 do not need to be the same, and may be different from each other.

Flow of Processes

Figure 5:
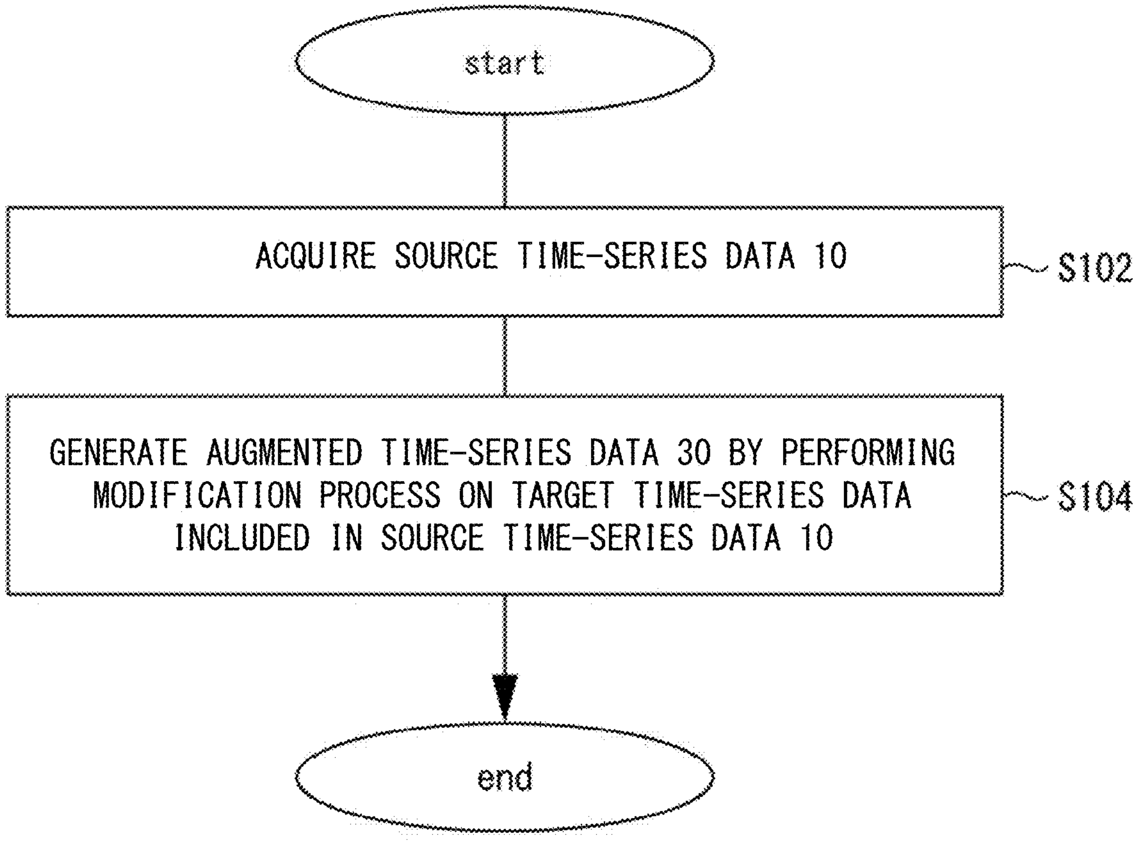
FIG. 5 is a flowchart exemplifying a flow of processes executed by the data augmentation apparatus.

FIG. 5 is a flowchart exemplifying a flow of processes executed by the data augmentation apparatus 2000 according to the example embodiment. The acquisition unit 2020 acquires the source time-series data 10 (S102). The augmentation processing unit 2040 generates the augmented time-series data 30 by performing a modification process on one or more pieces of target time-series data (S104).

Acquisition of Source Time-Series Data 10: S102

The acquisition unit 2020 acquires the source time-series data 10. Here, various methods may be adopted as a method of acquiring time-series data that is a modification target. For example, it is assumed that the source time-series data 10 is stored in advance in any storage device in a manner that the source time-series data 10 can be acquired from the data augmentation apparatus 2000. In this case, the acquisition unit 2020 acquires the source time-series data 10 by reading out the source time-series data 10 from the storage device.

In addition, for example, the acquisition unit 2020 acquires the source time-series data 10 by receiving the source time-series data 10 transmitted from another apparatus. The apparatus that transmits the source time-series data 10 is, for example, an apparatus that has generated the source time-series data 10. In a case where the source time-series data 10 is video data, for example, the acquisition unit 2020 acquires the source time-series data 10 from a video camera that has generated the source time-series data 10.

Information for Identifying Class of Frame 12

The data augmentation apparatus 2000 needs to be able to identify a class to which each piece of the partial time-series data 20 belongs. Therefore, for example, the data augmentation apparatus 2000 acquires information (hereinafter, class information) indicating the class to which each piece of the partial time-series data 20 belongs.

For example, the class information indicates an association between identification information (for example, a frame number) of each frame 12 included in the source time-series data 10 and identification information of a class to which the frame 12 belongs. In addition, for example, the class information may indicate identification information of one or both of the first frame 12 and the last frame 12 for each piece of the partial time-series data 20 included in the source time-series data 10.

FIG. 6 is a diagram exemplifying class information in a table format. A table 200 indicates a class to which the frame 12 belongs for each frame 12. More specifically, identification information (class identification information 204) of the class to which the frame 12 belongs is indicated in association with identification information (frame identification information 202) of the frame 12.

On the other hand, a table 300 indicates a class to which the partial time-series data 20 belongs for each piece of partial time-series data 20. More specifically, for the partial time-series data 20, identification information (class identification information 306) of a class to which the partial time-series data 20 belongs is indicated in association with a combination of identification information (first frame identification information 302) of the first frame 12 and identification information (last frame identification information 304) of the last frame 12.

The class information may be information integrated with the source time-series data 10 or may be information separated from the source time-series data 10. In the former case, for example, identification information of a class to which the frame 12 belongs is added as metadata to each frame 12 included in the source time-series data 10. In a case where the source time-series data 10 and the class information are configured separately, for example, the acquisition unit 2020 further acquires class information for the source time-series data 10 in addition to the source time-series data 10. A method of acquiring class information is similar to the method of acquiring the source time-series data 10.

Modification Process: S104

The augmentation processing unit 2040 performs a modification process on one or more pieces of target time-series data (S104). The modification process includes 1) a deletion process, 2) a length change process, or 3) a position change process. Each of 1) to 3) will be described below. Note that a method of determining a modification process to be executed and a method of determining target time-series data that is a target of a modification process will be described later.

Deletion Process

Figure 7:
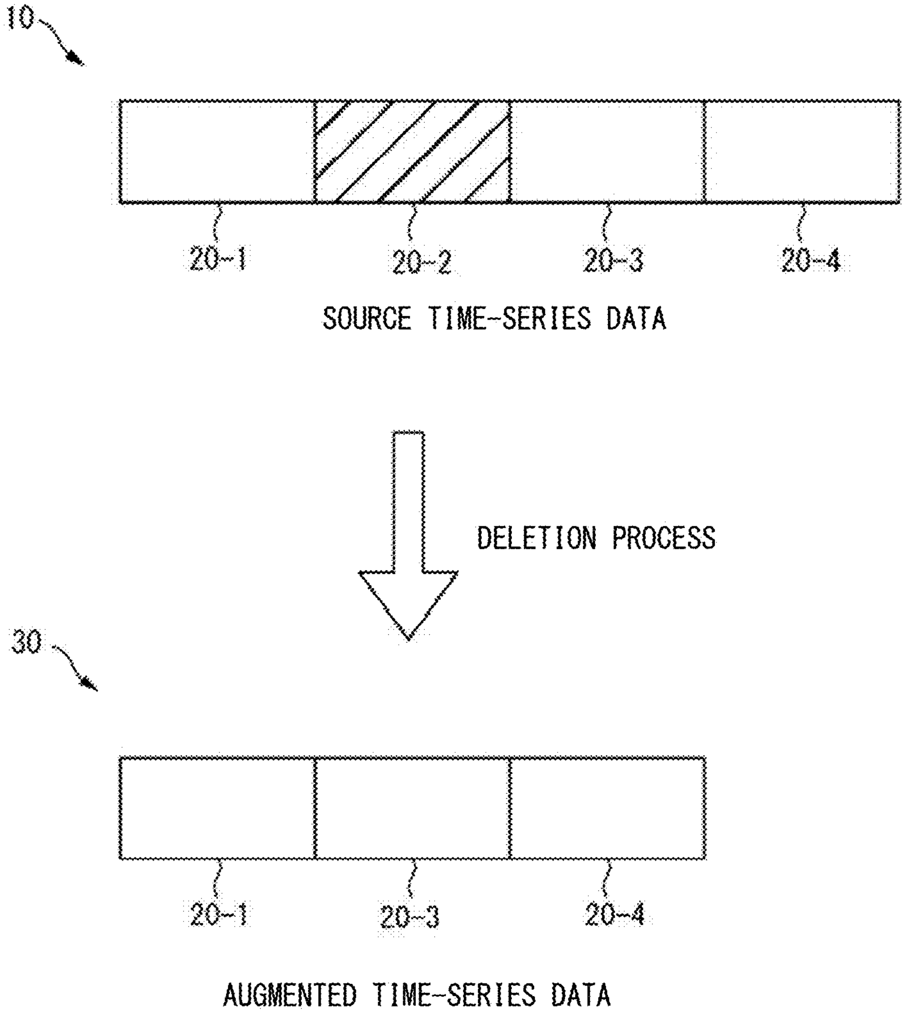
FIG. 7 is a first diagram exemplifying a deletion process.

The deletion process is a process for generating data that is the source time-series data 10 from which the target time-series data is excluded, as the augmented time-series data 30. FIG. 7 is a first diagram exemplifying the deletion process. In FIG. 7, the partial time-series data 20-2 is handled as the target time-series data. Therefore, the augmented time-series data 30 is generated by removing the partial time-series data 20-2 from the source time-series data 10.

Figure 8:
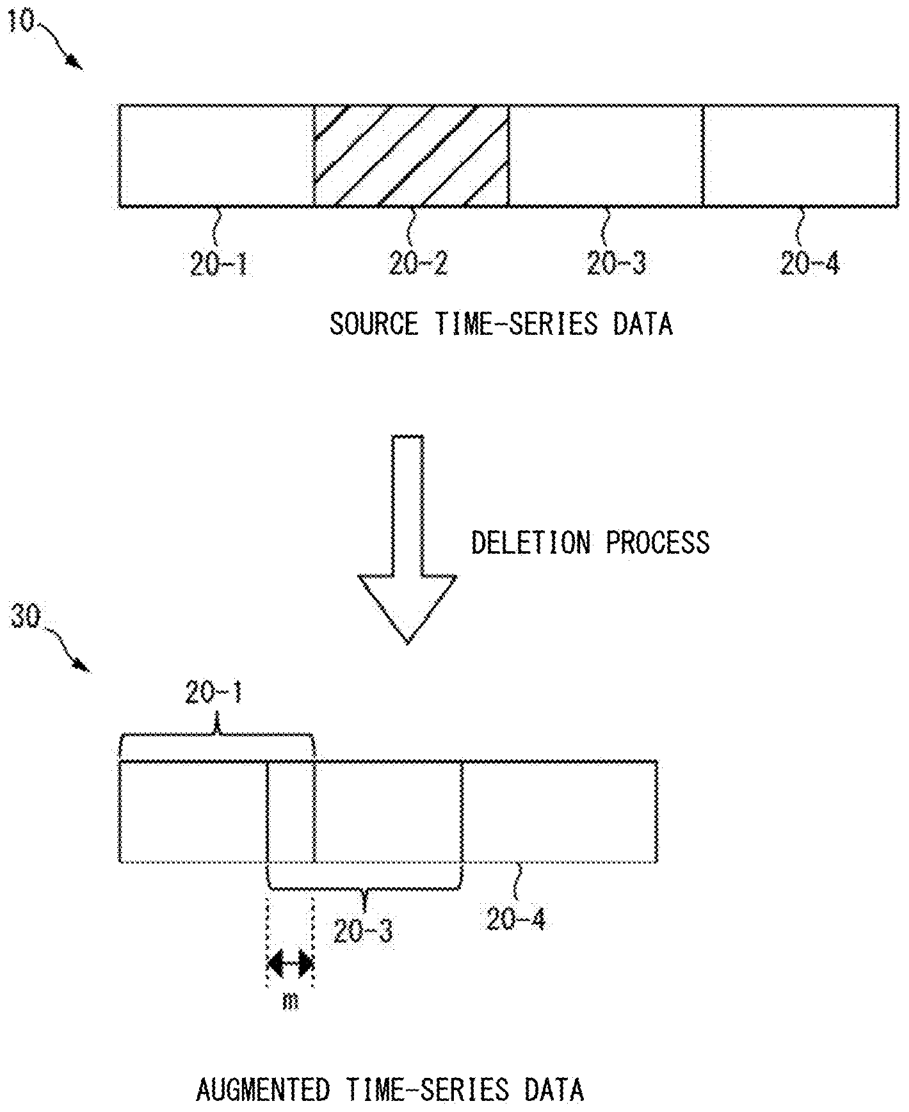
FIG. 8 is a second diagram exemplifying a deletion process.

After removing the target time-series data, the augmentation processing unit 2040 may perform a modification process of superimposing parts of the partial time-series data 20 before and after the target time-series data. FIG. 8 is a second diagram exemplifying an example of a deletion process. In FIG. 8, like in FIG. 7, the partial time-series data 20-2 is deleted. Further, in FIG. 8, the last m frames of the partial time-series data 20-1 preceding the partial time-series data 20-2 and the first m frames of the partial time-series data 20-3 following the partial time-series data 20-2 are superimposed on each other. In this way, the two pieces of partial time-series data 20 originally separated in terms of time are relatively naturally connected.

Here, when the superimposition is performed, the tail of the front partial time-series data 20 may be faded out and the head of the rear partial time-series data 20 may be faded in. As a result, connection between the two pieces of partial time-series data 20 becomes more natural.

The augmentation processing unit 2040 generates the class information of the augmented time-series data 30 based on the class information of the source time-series data 10 and the modification process executed on the source time-series data 10. In a case where the deletion process is performed, for example, the augmentation processing unit 2040 deletes the information regarding the deleted partial time-series data 20 from the class information of the source time-series data 10 and thus generates the class information of the augmented time-series data 30. Note that, in a case where the class information is added to the frame 12, the class information is also deleted at the same time by deleting the partial time-series data 20.

Here, in a case where the process of superimposing the partial time-series data 20 before and after the deleted partial time-series data 20 is performed, the augmentation processing unit 2040 determines a class for each new frame 12 generated with the superimposition. For example, a class of the new frame 12 is set to a class of the frame 12 in which the opacity is set to be higher out of the two superimposed frames 12. For example, it is assumed that the frame 12 of the class C1 is set to the opacity D1, the frame 12 of the class C2 is set to the opacity D2, and the frames are superimposed on each other. In this case, for example, the class of the new frame 12 is set to C1 if D1>=D2, while the class of the new frame 12 is set to C2 if D1<D2.

Length Change Process

The length change process is a process of changing a length on the time axis of target time-series data. The process of changing a length of target time-series data is roughly divided into a process of lengthening the target time-series data and a process of shortening the target time-series data. Each will be described below.

Process of Lengthening Target Time-Series Data

For example, the augmentation processing unit 2040 increases a length of target time-series data by performing a process of delaying the flow of time (hereinafter, a speed decrease process) on a part or the whole of the target time-series data. For this process, for example, any method used when a video or an audio is reproduced at a lower speed may be adopted.

Figure 9:
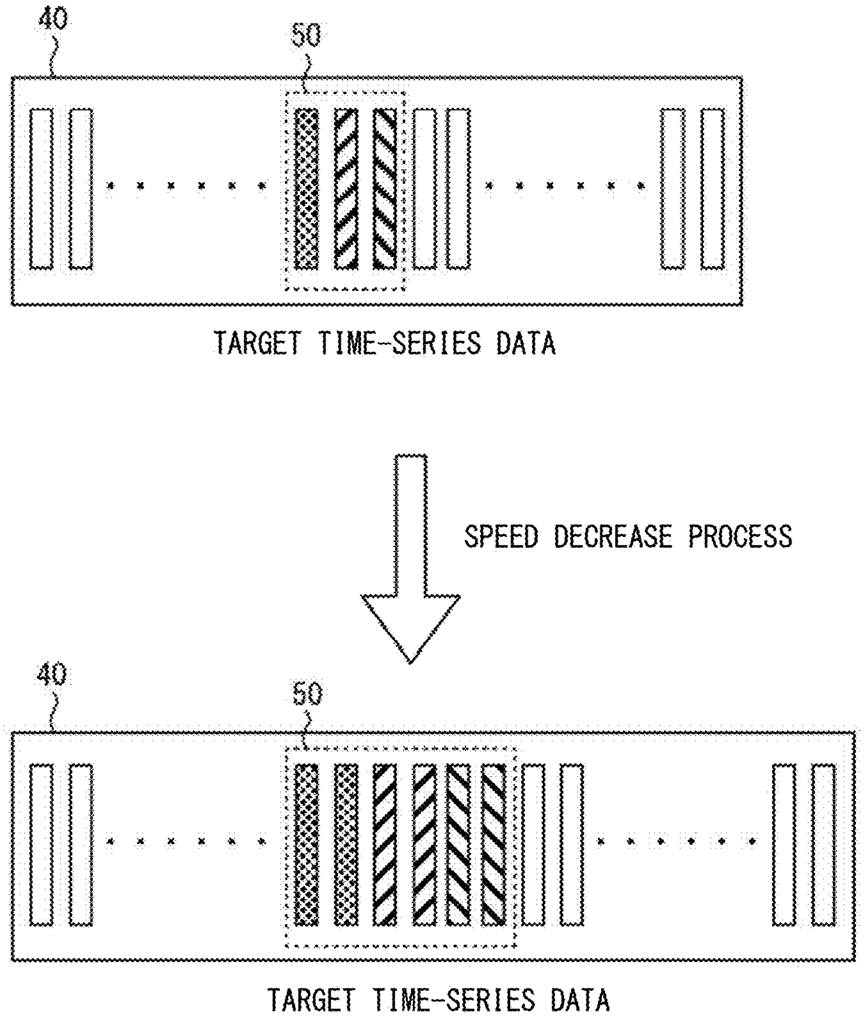
FIG. 9 is a diagram exemplifying a speed decrease process.

FIG. 9 is a diagram exemplifying a speed decrease process. In the example in FIG. 9, a length of the target time-series data is increased by copying each frame 12 included in a time range 50 in the target time-series data 40. In a case where the source time-series data is video data, a portion of the time range 50 becomes a slow motion portion through the process in FIG. 9. Here, instead of copying each 10 frame 12, the augmentation processing unit 2040 may insert, between two frames 12 adjacent to each other, the frame 12 that represents the middle of the two frames, e.g., the frame 12 obtained by averaging the two frames 12. This process may be realized by a frame interpolation process.

In the example in FIG. 9, a single copy of each frame 12 is generated, but the number of copies is not limited to one. The number of copies may be set in advance or may be dynamically (for example, randomly) determined.

Here, there are various methods of determining the time range 50 that is a target of the speed decrease process. For example, the augmentation processing unit 2040 determines the time range 50 by randomly selecting the frame 12 as a start point of the time range 50 25 from the target time-series data 40. Note that a length of the time range 50 may be set in advance or may be dynamically (for example, randomly) determined. The start point of the time range 50 may be selected based on a predetermined rule. For example, in a case where a plurality of pieces of augmented time-series data 30 subjected to 30 speed decrease processes of different patterns are generated, a method of shifting the start point of the time range 50 by a predetermined number can be considered.

In addition, for example, the augmentation processing unit 2040 may determine a time range in which a change among the frames 12 is large from the target time-series data 40, and perform the speed decrease process on the time range. This is because it is highly probable that the content of the time-series data in the time range in which a change among the frames 12 is large is not unnatural even if the magnitude of the time change is reduced to some extent through the speed decrease process.

The magnitude of the change among the frames 12 may be calculated based on a difference among the frames 12. In a case where the source time-series data 10 is video data, the magnitude of the change among the frames 12 may be represented by, for example, a statistical value (an average value, a maximum value, or a median value) of the magnitude of an optical flow. More specifically, for example, the augmentation processing unit 2040 divides the target time-series data 40 for each time range with a predetermined length, and calculates, for each time range, a statistical value of the magnitude of the change among a plurality of the frames 12 included in the time range. The augmentation processing unit 2040 handles a time range in which the statistical value of the magnitude of the change is equal to or more than a threshold value as the time range 50 that is a target of the speed decrease process.

Note that, instead of performing the speed decrease process on the time range 50, the speed decrease process may be performed according to a method of selecting one or more frames 12 at positions separated from each other and generating a copy of each selected frame 12. For example, in this case, the augmentation processing unit 2040 randomly selects the frame 12 from the target time-series data 40, and handles it as a target of the speed decrease process. In addition, for example, the augmentation processing unit 2040 may individually select the frame 12 whose magnitude of a change from the previous frame 12 is equal to or larger than a threshold value from the target time-series data 40, and handle it as a target of the speed decrease process.

Figure 10:
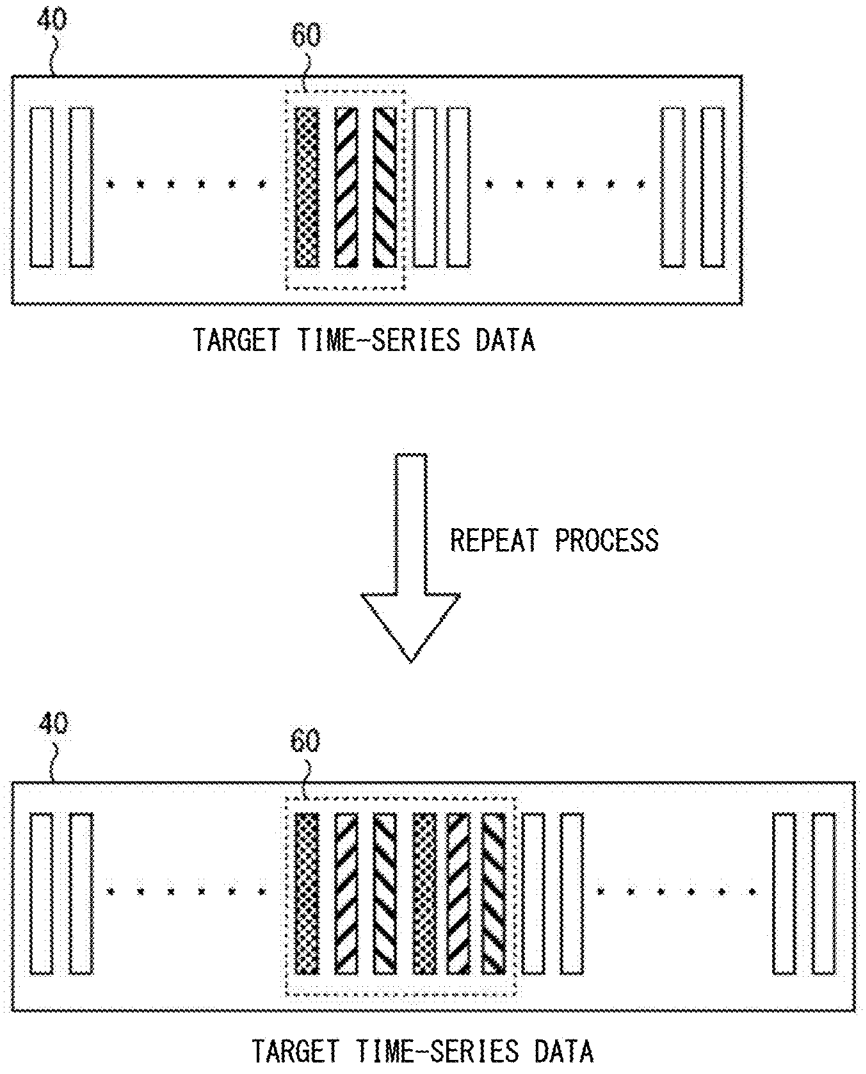
FIG. 10 is a process exemplifying a repeat process.

A process of lengthening the target time-series data 40 is not limited to the speed decrease process. For example, the augmentation processing unit 2040 may increase the length of the target time-series data 40 by performing a process (hereinafter, a repeat process) of causing a part or the whole of the target time-series data 40 to be repeated. FIG. 10 is a process exemplifying a repeat process. In the example in FIG. 10, the repeat process is performed such that the portion of the time range 60 is repeated twice.

There are various methods of selecting a target of the repeat process. For example, the augmentation processing unit 2040 randomly selects a time range from the target time-series data 40 and performs the repeat process on the time range. A length of the selected time range may be defined in advance or determined dynamically (for example, randomly). Furthermore, in a case where a plurality of pieces of augmented time-series data 30 subjected to repeat processes of different patterns are generated, a method of increasing a length of the selected time range by a predetermined number can be considered.

In addition, for example, the augmentation processing unit 2040 may detect a time range having a specific meaning from the target time-series data 40 and perform the repeat process on the time range. In a case where the target time-series data 40 is video data, for example, the augmentation processing unit 2040 detects a time range representing a series of changes (for example, an operation) from the target time-series data 40 and performs the repeat process on the time range. The series of changes is, for example, a periodic change such as an operation of tightening a screw or turning a lever. In addition, for example, the series of changes may be non-periodic changes such as an operation of opening a door or an operation of lowering a lever. When such a series of changes is repeated, it is possible to generate the augmented time-series data 30 representing a more natural situation compared with a case where a target of the repeat process is randomly determined.

There are various methods of detecting a series of changes from the target time-series data 40. In a case where the source time-series data 10 is video data, for example, the augmentation processing unit 2040 performs a skeleton detection process on each frame 12 of the target time-series data 40, and detects a time range in which the position of the skeleton periodically changes from the target time-series data 40. The augmentation processing unit 2040 detects the detected time range as a time range representing a series of changes.

In addition, for example, in a case where the source time-series data 10 is signal data such as audio data, the augmentation processing unit 2040 detects a time range in which the intensity of a signal or the like periodically changes from the target time-series data 40, and detects the detected time range as a time range representing a series of changes.

In addition, for example, the augmentation processing unit 2040 divides the target time-series data 40 for each time range with a predetermined length, and performs a process of determining whether or not a specific event has occurred in each time range. As a result, a time range in which a specific event has occurred is detected from the target time-series data 40. Here, an existing technique may be used as a technique for determining whether or not a specific event is represented by time-series data. For example, in a case where the source time-series data 10 is video data, the event is a particular action performed by a person.

Process of Shortening Target Time-Series Data

For example, the augmentation processing unit 2040 reduces a length of the target time-series data 40 by performing a process of accelerating the flow of time (hereinafter, a speed increase process) on a part or the whole of the target time-series data 40. For this process, for example, any method used when a video or an audio is reproduced at a higher speed may be adopted.

Figure 11:
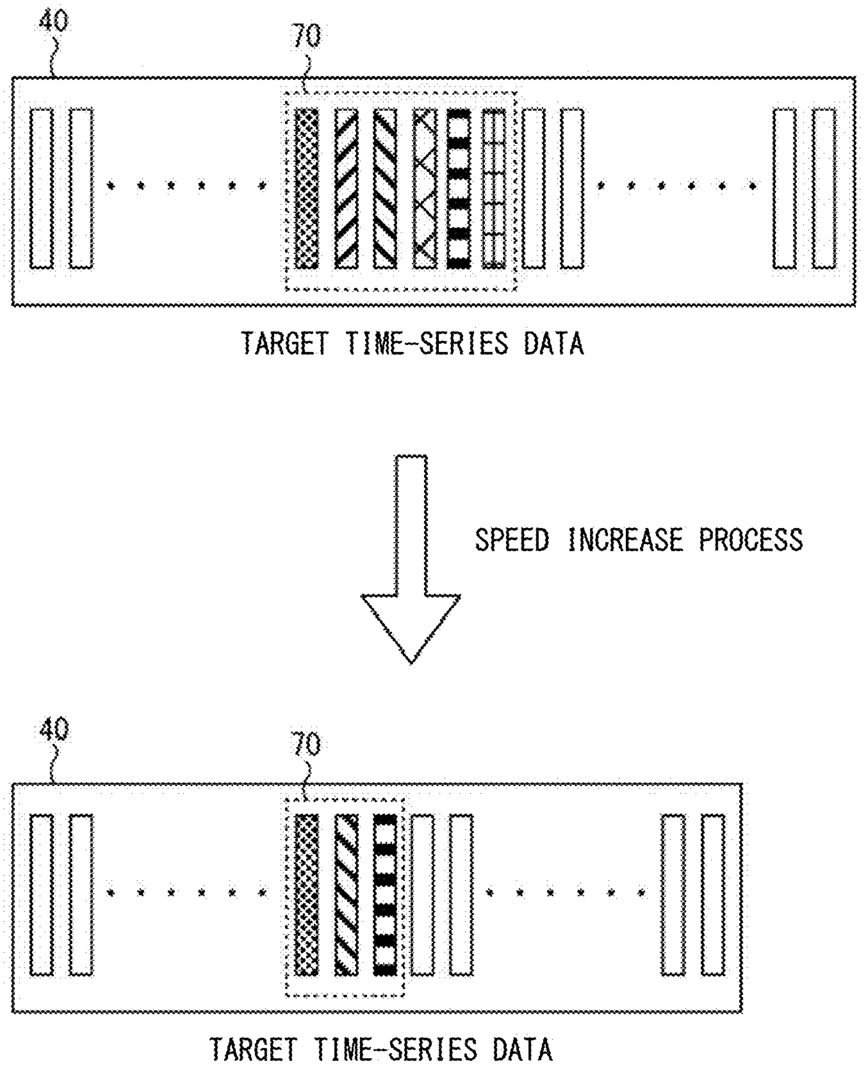
FIG. 11 is a diagram exemplifying a speed increase process.

FIG. 11 is a diagram exemplifying an example of the speed increase process. In the example in FIG. 11, a length of the target time-series data is reduced by deleting one out of two of the frames 12 included in a time range 70 in the target time-series data 40. This can also be expressed as "Frames 12 are down-sampled in the time range 70". Note that the down-sampling ratio is not limited to "one out of two", and can be generalized as "B out of A" (A>B). Note that values of A and B may be defined in advance or may be determined dynamically (for example, randomly).

Note that the augmentation processing unit 2040 may reduce the length of the target time-series data 40 by deleting the whole of the time range 70 instead of down-sampling the time range 70. In this case, similarly to the deletion process described above, the augmentation processing unit 2040 may superimpose time ranges with a predetermined length before and after the time range 70.

As a method of determining the time range 70 that is a target of the speed increase process, a method similar to the method of determining the time range 50 that is a target of the speed decrease process may be used. However, in the case of focusing on the magnitude of the change among the frames 12, the augmentation processing unit 2040 preferably sets a range in which the magnitude of the change is small as a target of the speed increase process. This is because it is highly probable that the content of the time-series data in which a change among the frames 12 is small is not unnatural even if the magnitude of the change is increased to some extent through the speed increase process. For example, the augmentation processing unit 2040 divides the target time-series data 40 for each time range with a predetermined length, and calculates, for each time range, a statistical value of the magnitude of a change in the plurality of frames 12 included in the time range. The augmentation processing unit 2040 handles a range in which the statistical value of the magnitude of the change is equal to or less than a threshold value as the time range 70 that is a target of the speed increase process.

Note that, instead of performing the speed increase process on the time range 70, the speed increase process may be performed according to a method of selecting one or more frames 12 at positions separated from each other and deleting each selected frame 12. For example, in this case, the augmentation processing unit 2040 randomly selects the frame 12 from the target time-series data 40 and handles the frame 12 as a target of the speed increase process. In addition, for example, the augmentation processing unit 2040 may individually select the frame 12 whose magnitude of a change from the previous frame 12 is equal to or less than a threshold value from the target time-series data 40 and handles the frame 12 as a target of the speed increase process.

The augmentation processing unit 2040 generates class information of the augmented time-series data 30 based on the class information of the source time-series data 10 and the content of the length change process executed on the source time-series data 10. In a case where a process of increasing the length of the target time-series data 40 is performed by copying the frame 12 included in the target time-series data 40, the augmentation processing unit 2040 generates the class information of the augmented time-series data 30 such that the class of the generated new frame 12 is the same class as the frame 12 that is the source of the copy. On the other hand, in a case where a process of reducing the length of the target time-series data 40 is performed by deleting the frame 12 included in the target time-series data 40, the augmentation processing unit 2040 generates class information of the augmented time-series data 30 by deleting the class information of the deleted frame 12 from the class information of the source time-series data 10. Note that, in a case where the new frame 12 is generated through superimposition, the augmentation processing unit 2040 assigns a class to the frame 12. A method of assigning a class to the frame 12 generated through the superimposition is as described in the deletion process.

Position Change Process

The position change process is a process of changing a position of the partial time-series data 20 in the target time-series data 40. The position change process may be roughly divided into 1) a movement process of moving one piece of partial time-series data 20 to another position and 2) a switch process of exchanging positions of two pieces of partial time-series data 20.

Figure 12:
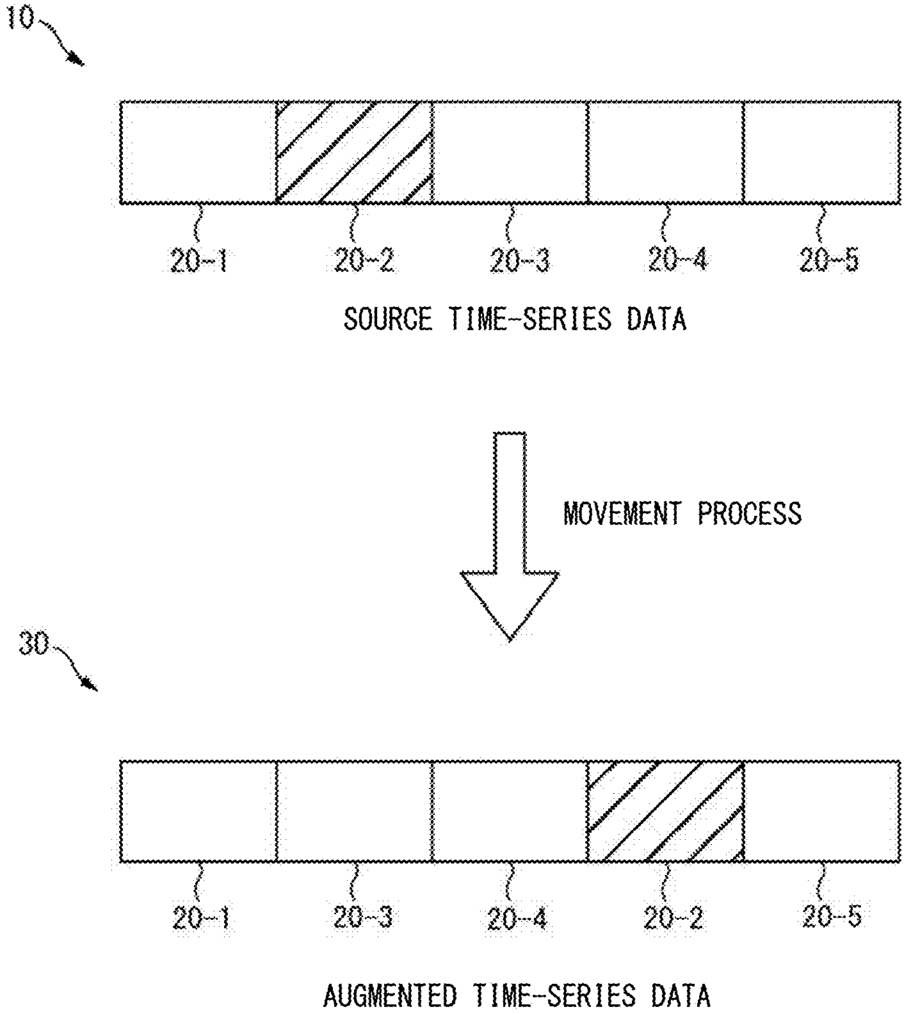
FIG. 12 is a diagram exemplifying a movement process.

FIG. 12 is a diagram exemplifying a movement process. In the example in FIG. 12, the partial time-series data 20-2 is moved after the partial time-series data 20-4. In other words, a position of the partial time-series data 20-2 has been changed to a position after the partial time-series data 20-4.

Figure 13:
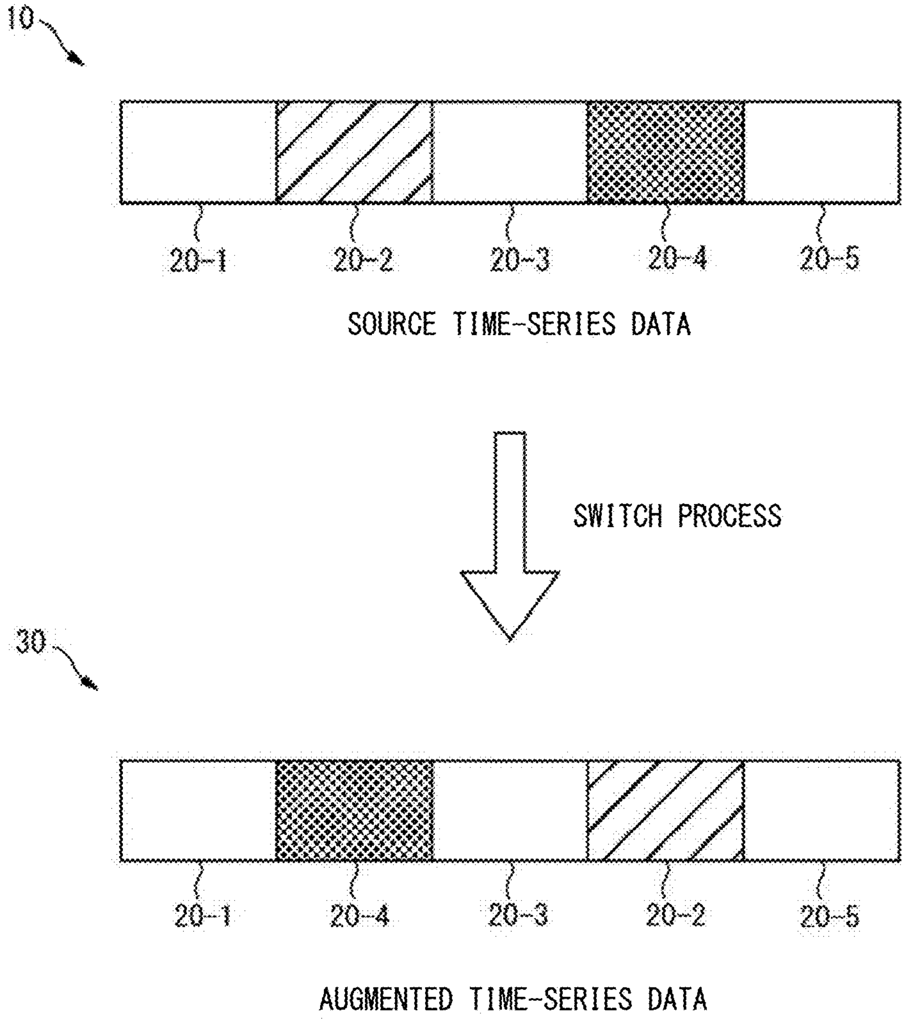
FIG. 13 is a diagram exemplifying a switch process.

FIG. 13 is a diagram exemplifying a switch process. In the example in FIG. 13, a position of the partial time-series data 20-2 and a position of the partial time-series data 20-4 are exchanged.

Here, the position change process may include a process of superimposing the head of the moved partial time-series data 20 and the tail of the partial time-series data 20 positioned before the head, and a process of superimposing the tail of the moved partial time-series data 20 and the head of the partial time-series data 20 positioned after the tail. For example, in the example in FIG. 12, a process of superimposing the head of the partial time-series data 20-2 and the tail of the partial time-series data 20-4, or a process of superimposing the tail of the partial time-series data 20-2 and the head of the partial time-series data 20-5 may be performed.

Furthermore, for the partial time-series data 20 that becomes adjacent to the other partial time-series data 20 as a result of the movement thereof, a process of superimposing the tail and the head thereof may be performed. For example, in the example in FIG. 12, as a result of the partial time-series data 20-2 being moved, the partial time-series data 20-1 and the partial time-series data 20-3 become adjacent to each other. Therefore, a process of superimposing the tail of the partial time-series data 20-1 and the head of the partial time-series data 20-3 may be performed.

Here, a method of superimposing the tail and the head of the partial time-series data 20 adjacent to each other is as described in the deletion process.

The augmentation processing unit 2040 generates class information of the augmented time-series data 30 based on the class information of the source time-series data 10 and the content of the position change process executed on the source time-series data 10. Specifically, for the partial time-series data 20 whose position has been changed between the source time-series data 10 and the augmented time-series data 30, the position thereof in the class information is also changed. In addition, a class is assigned to the frame 12 generated through superposition. A method of assigning a class to the frame 12 generated through the superimposition is as described in the deletion process.

Selection of Modification Process

A modification process to be performed on the source time-series data 10 may be defined in advance or may be freely selected from a plurality of types. Furthermore, the number of modification processes to be performed on the source time-series data 10 may be one or more. Note that the type and the number of modification processes may be randomly selected, or may be selected according to a certain rule. In a case where a plurality of pieces of augmented time-series data 30 are generated from the source time-series data 10, for example, a modification process is sequentially selected according to a predetermined order.

Similarly, target time-series data that is a target of a modification process may be defined in advance or may be freely selected.

Use of hint Information

It is assumed that time-series data in which a situation with a high occurrence probability is reproduced is required as the augmented time-series data 30. In this case, the data augmentation apparatus 2000 may acquire the type of a situation having a high occurrence probability and hint information representing an operation to be a target of the situation, and determine the type or a target of a modification process by using the hint information.

For example, it is assumed that it is required to generate the augmented time-series data 30 that is video data representing work performed in an erroneous procedure from the source time-series data 10 that is video data generated by capturing work performed in a normal procedure. Here, in an actual work site, there are work errors that occur frequently and work errors that hardly occur. Therefore, for example, the data augmentation apparatus 2000 acquires information indicating a work error having a high occurrence frequency and a class of work in which that error occurs, as the hint information. By using this hint information, the data augmentation apparatus 2000 can easily generate the augmented time-series data 30 representing a work error having a high occurrence frequency from the source time-series data 10 representing a normal work.

There are various types of situations indicated by the hint information. For example, a situation indicated by the hint information is a lack of an action (work is forgotten). In this case, the hint information indicates a class (for example, a class of work that is easily forgotten) corresponding to an action that is likely to be lacked. In a case where the hint information indicating such information is acquired, the augmentation processing unit 2040 detects the partial time-series data 20 belonging to the class indicated by the hint information from the source time-series data 10 and performs a deletion process on the partial time-series data 20.

In addition, for example, the situation indicated by the hint information is a situation in which an actual time length of an action deviates from an ideal time length (for example, work delay). In this case, the hint information indicates a class (for example, a class of work in which delay is likely to occur) corresponding to an action in which the actual time length is likely to deviate from the ideal time length. In a case where the hint information indicating such information is acquired, the augmentation processing unit 2040 detects the partial time-series data 20 belonging to the class indicated by the hint information from the source time-series data 10, and performs a length change process on the partial time-series data 20. Note that the hint information preferably further includes information indicating whether the length should be made longer or shorter.

In addition, for example, a situation indicated by the hint information is a situation in which an actual time position of an action deviates from an ideal time position (for example, exchange between two pieces of work). In this case, the hint information indicates a class (for example, a class of each of two actions that are likely to be erroneously exchanged in order) representing an action in which the actual time position is likely to deviate from the ideal time position. In a case where the hint information indicating such information is acquired, the augmentation processing unit 2040 detects the partial time-series data 20 belonging to the class indicated by the hint information from the source time-series data 10, and performs a position change process on the partial time-series data 20. Note that, in a case where a class of each of the two pieces of work that are likely to be exchanged is indicated by the hint information, the augmentation processing unit 2040 detects the partial time-series data 20 corresponding to each of the two classes from the source time-series data 10, and performs a switch process on the two detected pieces of partial time-series data 20.

In a case where the hint information is used, the acquisition unit 2020 further acquires the hint information. A method of acquiring the hint information is similar to the method of acquiring the source time-series data 10.

Here, the hint information may be general-purpose information that does not depend on the type of the source time-series data 10, or may be information (in other words, information specialized for a particular type of source time-series data 10) that depends on the type of the source time-series data 10. An example of the latter is a case where the hint information is prepared for each work line since, in a work site, a series of work processes performed in a work line is different for each work line.

In a case where the hint information is prepared for each type of the source time-series data 10, the acquisition unit 2020 further acquires type information indicating the type of the source time-series data 10. The acquisition unit 2020 acquires the hint information corresponding to the type of the source time-series data 10 indicated by the type information.

Here, in a case where a plurality of pieces of augmented time-series data 30 are generated from one piece of source time-series data 10, the augmentation processing unit 2040 may perform both generation of the augmented time-series data 30 using the hint information and generation of the augmented time-series data 30 not using the hint information. However, it is preferable that the number of pieces of augmented time-series data 30 generated using the hint information is larger than the number of pieces of augmented time-series data 30 generated without using the hint information.

For example, it is assumed that the augmentation processing unit 2040 is configured to select whether or not to use the hint information when generating each piece of augmented time-series data 30. In this case, a probability that the option of "using the hint information" is selected is set to be higher than a probability that the option of "not using the hint information" is selected.

Furthermore, the hint information may indicate the occurrence frequency (occurrence probability) of each event. In this case, the augmentation processing unit 2040 may set a generation probability to be higher for the augmented time-series data 30 corresponding to an event having a higher occurrence frequency.

Output of Result

The data augmentation apparatus 2000 outputs an execution result. Hereinafter, information output from the data augmentation apparatus 2000 will be referred to as output information. The output information includes the augmented time-series data 30. Furthermore, in a case where the augmented time-series data 30 and class information corresponding thereto are configured separately, the output information further includes class information of the augmented time-series data 30. Here, in a case where a plurality of pieces of augmented time-series data 30 are generated, the output information includes a plurality of combinations of the augmented time-series data 30 and the class information.

There are various manners of outputting the output information. For example, the data augmentation apparatus 2000 stores the output information in any storage device. In addition, for example, the data augmentation apparatus 2000 may transmit the output information to any apparatus. For example, a transmission destination apparatus is an apparatus that trains an identifier that identifies a class of each frame included in time-series data by using the augmented time-series data 30.

Although the present invention has been described above with reference to the example embodiments, the present invention is not limited to the above-described example embodiments. Various changes that can be understood by those skilled in the art can be made to the configuration and details of the present invention within the scope of the present invention.

In the above-described example, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The whole or part of the example embodiments disclosed above can be described as, but not limited to, the following supplementary notes.

Supplementary Note 1

A data augmentation apparatus comprising:

acquisition means for acquiring source time-series data including a plurality of frames in a time series; and augmentation processing means for generating augmented time-series data from the source time-series data by executing, on one or more pieces of target time-series data that are included in the source time-series data and configured by a plurality of consecutive frames belonging to a same class as each other, a deletion process of deleting target time-series data, a length change process of changing a length of the target time-series data, or a position change process of changing a position of the target time-series data on a time axis, wherein the source time-series data includes a plurality of frames belonging to different classes.

Supplementary Note 2

The data augmentation apparatus according to supplementary note 1, wherein the length change process is:

a process of lengthening the target time-series data by copying one or more frames included in the target time-series data; or a process of shortening the target time-series data by deleting one or more frames included in the target time-series data.

Supplementary Note 3

The data augmentation apparatus according to supplementary note 2, wherein the length change process is a process of lengthening the target time-series data by causing a part or a whole of the target time-series data to be repeated in the augmented time-series data.

Supplementary Note 4

The data augmentation apparatus according to supplementary note 3, wherein the length change process is a process of detecting a time range in which content of the target time-series data periodically changes from the target time-series data, and lengthening the target time-series data by causing a sequence of the frames included in the detected time range to be repeated in the augmented time-series data.

Supplementary Note 5

The data augmentation apparatus according to supplementary note 1, wherein the position change process is a process of changing a position of the target time-series data by exchanging positions of two pieces of the target time-series data.

Supplementary Note 6

The data augmentation apparatus according to any one of supplementary notes 1 to 5, wherein the acquisition means acquires hint information indicating a situation whose occurrence probability is high and a class of an action that is a target of the situation, and wherein the augmentation processing means generates the augmented time-series data by performing, on the target time-series data configured by the frames belonging to the class indicated by the hint information, a modification process for reproducing the situation indicated by the hint information.

Supplementary Note 7

The data augmentation apparatus according to supplementary note 6, wherein the hint information indicates a class of an action for a situation in which the action lacks, and wherein the augmentation processing means generates the augmented time-series data by performing the deletion process on the target time-series data configured by the frames belonging to the class indicated by the hint information.

Supplementary Note 8

The data augmentation apparatus according to supplementary note 6, wherein the hint information indicates a class of an action for a situation in which an actual time length of the action deviates from an ideal time length, and wherein the augmentation processing means generates the augmented time-series data by performing the length change process on the target time-series data configured by the frames belonging to the class indicated by the hint information.

Supplementary Note 9

The data augmentation apparatus according to supplementary note 6, wherein the hint information indicates a class of an action for a situation in which an actual time position of the action deviates from an ideal time position, and wherein the augmentation processing means generates the augmented time-series data by performing the position change process on the target time-series data configured by the frames belonging to the class indicated by the hint information.

Supplementary Note 10

The data augmentation apparatus according to any one of supplementary notes 1 to 9, wherein the source time-series data is video data, and wherein a class to which the frame belongs represents a type of work captured on that frame.

Supplementary Note 11

A data augmentation method executed by a computer, the data augmentation method comprising:

an acquisition step of acquiring source time-series data including a plurality of frames in a time series; and an augmentation processing step of generating augmented time-series data from the source time-series data by executing, on one or more pieces of target time-series data that are included in the source time-series data and configured by a plurality of consecutive frames belonging to a same class as each other, a deletion process of deleting target time-series data, a length change process of changing a length of the target time-series data, or a position change process of changing a position of the target time-series data on a time axis, wherein the source time-series data includes a plurality of frames belonging to different classes.

Supplementary Note 12

The data augmentation method according to supplementary note 11, wherein the length change process is:

a process of lengthening the target time-series data by copying one or more frames included in the target time-series data; or a process of shortening the target time-series data by deleting one or more frames included in the target time-series data.

Supplementary Note 13

The data augmentation method according to supplementary note 12, wherein the length change process is a process of lengthening the target time-series data by causing a part or a whole of the target time-series data to be repeated in the augmented time-series data.

Supplementary Note 14

The data augmentation method according to supplementary note 13, wherein the length change process is a process of detecting a time range in which content of the target time-series data periodically changes from the target time-series data, and lengthening the target time-series data by causing a sequence of the frames included in the detected time range to be repeated in the augmented time-series data.

Supplementary Note 15

The data augmentation method according to supplementary note 11, wherein the position change process is a process of changing a position of the target time-series data by exchanging positions of two pieces of the target time-series data.

Supplementary Note 16

The data augmentation method according to any one of supplementary notes 11 to 15, wherein in the acquisition step, acquiring hint information indicating a situation whose occurrence probability is high and a class of an action that is a target of the situation, and wherein in the augmentation processing step, generating the augmented time-series data by performing, on the target time-series data configured by the frames belonging to the class indicated by the hint information, a modification process for reproducing the situation indicated by the hint information.

Supplementary Note 17

The data augmentation method according to supplementary note 16, wherein the hint information indicates a class of an action for a situation in which the action lacks, and wherein in the augmentation processing step, generating the augmented time-series data by performing the deletion process on the target time-series data configured by the frames belonging to the class indicated by the hint information.

Supplementary Note 18

The data augmentation method according to supplementary note 16, wherein the hint information indicates a class of an action for a situation in which an actual time length of the action deviates from an ideal time length, and wherein in the augmentation processing step, generating the augmented time-series data by performing the length change process on the target time-series data configured by the frames belonging to the class indicated by the hint information.

Supplementary Note 19

The data augmentation method according to supplementary note 16, wherein the hint information indicates a class of an action for a situation in which an actual time position of the action deviates from an ideal time position, and wherein in the augmentation processing step, generating the augmented time-series data by performing the position change process on the target time-series data configured by the frames belonging to the class indicated by the hint information.

Supplementary Note 20

The data augmentation method according to any one of supplementary notes 11 to 19, wherein the source time-series data is video data, and wherein a class to which the frame belongs represents a type of work captured on that frame.

Supplementary Note 21

A non-transitory computer readable medium storing a program for causing a computer to execute:

an acquisition step of acquiring source time-series data including a plurality of frames in a time series; and an augmentation processing step of generating augmented time-series data from the source time-series data by executing, on one or more pieces of target time-series data that are included in the source time-series data and configured by a plurality of consecutive frames belonging to a same class as each other, a deletion process of deleting target time-series data, a length change process of changing a length of the target time-series data, or a position change process of changing a position of the target time-series data on a time axis, wherein the source time-series data includes a plurality of frames belonging to different classes.

Supplementary Note 22

The computer readable medium according to supplementary note 21, wherein the length change process is:

a process of lengthening the target time-series data by copying one or more frames included in the target time-series data; or a process of shortening the target time-series data by deleting one or more frames included in the target time-series data.

Supplementary Note 23

The computer readable medium according to supplementary note 22, wherein the length change process is a process of lengthening the target time-series data by causing a part or a whole of the target time-series data to be repeated in the augmented time-series data.

Supplementary Note 24

The computer readable medium according to supplementary note 23, wherein the length change process is a process of detecting a time range in which content of the target time-series data periodically changes from the target time-series data, and lengthening the target time-series data by causing a sequence of the frames included in the detected time range to be repeated in the augmented time-series data.

Supplementary Note 25

The computer readable medium according to supplementary note 21, wherein the position change process is a process of changing a position of the target time-series data by exchanging positions of two pieces of the target time-series data.

Supplementary Note 26

The computer readable medium according to any one of supplementary notes 21 to 25, wherein in the acquisition step, acquiring hint information indicating a situation whose occurrence probability is high and a class of an action that is a target of the situation, and wherein in the augmentation processing step, generating the augmented time-series data by performing, on the target time-series data configured by the frames belonging to the class indicated by the hint information, a modification process for reproducing the situation indicated by the hint information.

Supplementary Note 27

The computer readable medium according to supplementary note 26, wherein the hint information indicates a class of an action for a situation in which the action lacks, and wherein in the augmentation processing step, generating the augmented time-series data by performing the deletion process on the target time-series data configured by the frames belonging to the class indicated by the hint information.

Supplementary Note 28

The computer readable medium according to supplementary note 26, wherein the hint information indicates a class of an action for a situation in which an actual time length of the action deviates from an ideal time length, and wherein in the augmentation processing step, generating the augmented time-series data by performing the length change process on the target time-series data configured by the frames belonging to the class indicated by the hint information.

Supplementary Note 29

The computer readable medium according to supplementary note 26, wherein the hint information indicates a class of an action for a situation in which an actual time position of the action deviates from an ideal time position, and wherein in the augmentation processing step, generating the augmented time-series data by performing the position change process on the target time-series data configured by the frames belonging to the class indicated by the hint information.

Supplementary Note 30

The computer readable medium according to any one of supplementary notes 21 to 29, wherein the source time-series data is video data, and wherein a class to which the frame belongs represents a type of work captured on that frame.

Reference Signs List

10 SOURCE TIME-SERIES DATA
12 FRAME
20 PARTIAL TIME-SERIES DATA
30 AUGMENTED TIME-SERIES DATA
40 TARGET TIME-SERIES DATA
50 TIME RANGE
60 TIME RANGE
70 TIME RANGE
200 TABLE
202 FRAME IDENTIFICATION INFORMATION
204 CLASS IDENTIFICATION INFORMATION
300 TABLE
302 FIRST FRAME IDENTIFICATION INFORMATION
304 LAST FRAME IDENTIFICATION INFORMATION
306 CLASS IDENTIFICATION INFORMATION
500 COMPUTER
502 BUS
504 PROCESSOR
506 MEMORY
508 STORAGE DEVICE
510 INPUT/OUTPUT INTERFACE
512 NETWORK INTERFACE
2000 DATA AUGMENTATION APPARATUS
2020 ACQUISITION UNIT
2040 AUGMENTATION PROCESSING UNIT

What is claimed is:

1. A data augmentation apparatus comprising:

at least one memory that is configured to store instructions; and at least one processor that is configured to execute the instructions to:

acquire source time-series data including a plurality of frames in a time series; and generate augmented time-series data from the source time-series data by executing, on one or more pieces of target time-series data that are included in the source time-series data and configured by a plurality of consecutive frames belonging to a same class as each other, a deletion process of deleting target time-series data, a length change process of changing a length of the target time-series data, or a position change process of changing a position of the target time-series data on a time axis, wherein the source time-series data includes a plurality of frames belonging to different classes, wherein the class represents a scene or a situation represented by a plurality of consecutive frames belonging to that class, wherein the length change process includes:

a process of lengthening the target time-series data by copying one or more frames included in the target time-series data; or a process of shortening the target time-series data by deleting one or more frames included in the target time-series data, wherein the length change process is a process of lengthening the target time-series data by causing a part or a whole of the target time-series data to be repeated in the augmented time-series data, and wherein the length change process is a process of detecting a time range in which content of the target time-series data periodically changes from the target time-series data, and lengthening the target time-series data by causing a sequence of the frames included in the detected time range to be repeated in the augmented time-series data.

2. The data augmentation apparatus according to claim 1, wherein the position change process is a process of changing a position of the target time-series data by exchanging positions of two pieces of the target time-series data.

3. The data augmentation apparatus according to claim 1, wherein the at least one processor is configured to execute the instructions further to acquire hint information indicating a situation whose occurrence probability is high and a class of an action that is a target of the situation, and wherein the generation of the augmented time-series data includes generating the augmented time-series data by performing, on the target time-series data configured by the frames belonging to the class indicated by the hint information, a modification process for reproducing the situation indicated by the hint information.

4. The data augmentation apparatus according to claim 3, wherein the hint information indicates a class of an action for a situation in which the action lacks, and wherein the generation of the augmented time-series data includes generating the augmented time-series data by performing the deletion process on the target time-series data configured by the frames belonging to the class indicated by the hint information.

5. The data augmentation apparatus according to claim 3, wherein the hint information indicates a class of an action for a situation in which an actual time length of the action deviates from an ideal time length, and wherein the generation of the augmented time-series data includes generating the augmented time-series data by performing the length change process on the target time-series data configured by the frames belonging to the class indicated by the hint information.

6. The data augmentation apparatus according to claim 3, wherein the hint information indicates a class of an action for a situation in which an actual time position of the action deviates from an ideal time position, and wherein the generation of the augmented time-series data includes generating the augmented time-series data by performing the position change process on the target time-series data configured by the frames belonging to the class indicated by the hint information.

7. The data augmentation apparatus according to claim 1, wherein the source time-series data is video data, and wherein a class to which the frame belongs represents a type of work captured on that frame.

8. A data augmentation method executed by a computer, the data augmentation method comprising:

acquiring source time-series data including a plurality of frames in a time series; and generating augmented time-series data from the source time-series data by executing, on one or more pieces of target time-series data that are included in the source time-series data and configured by a plurality of consecutive frames belonging to a same class as each other, a deletion process of deleting target time-series data, a length change process of changing a length of the target time-series data, or a position change process of changing a position of the target time-series data on a time axis, wherein the source time-series data includes a plurality of frames belonging to different classes, wherein the class represents a scene or a situation represented by a plurality of consecutive frames belonging to that class, wherein the length change process includes:

a process of lengthening the target time-series data by copying one or more frames included in the target time-series data; or a process of shortening the target time-series data by deleting one or more frames included in the target time-series data, wherein the length change process is a process of lengthening the target time-series data by causing a part or a whole of the target time-series data to be repeated in the augmented time-series data, and wherein the length change process is a process of detecting a time range in which content of the target time-series data periodically changes from the target time-series data, and lengthening the target time-series data by causing a sequence of the frames included in the detected time range to be repeated in the augmented time-series data.

9. The data augmentation method according to claim 8, wherein the position change process is a process of changing a position of the target time-series data by exchanging positions of two pieces of the target time-series data.

10. A non-transitory computer readable medium storing a program for causing a computer to execute:

acquiring source time-series data including a plurality of frames in a time series; and generating augmented time-series data from the source time-series data by executing, on one or more pieces of target time-series data that are included in the source time-series data and configured by a plurality of consecutive frames belonging to a same class as each other, a deletion process of deleting target time-series data, a length change process of changing a length of the target time-series data, or a position change process of changing a position of the target time-series data on a time axis, wherein the source time-series data includes a plurality of frames belonging to different classes, wherein the class represents a scene or a situation represented by a plurality of consecutive frames belonging to that class, wherein the length change process includes:

a process of lengthening the target time-series data by copying one or more frames included in the target time-series data; or a process of shortening the target time-series data by deleting one or more frames included in the target time-series data, wherein the length change process is a process of lengthening the target time-series data by causing a part or a whole of the target time-series data to be repeated in the augmented time-series data, and wherein the length change process is a process of detecting a time range in which content of the target time-series data periodically changes from the target time-series data, and lengthening the target time-series data by causing a sequence of the frames included in the detected time range to be repeated in the augmented time-series data.

11. The non-transitory computer readable medium according to claim 10, wherein the position change process is a process of changing a position of the target time-series data by exchanging positions of two pieces of the target time-series data.

* * * * *